United States Patent
Okada et al.

(10) Patent No.: US 7,878,293 B2
(45) Date of Patent: Feb. 1, 2011

(54) STEERING SHAFT SUPPORTING STRUCTURE OF VEHICLE

(75) Inventors: Megumu Okada, Saitama (JP); Keita Yagi, Saitama (JP); Yotaro Mori, Saitama (JP); Takeshi Wakabayashi, Saitama (JP); Kihoko Kaita, Saitama (JP); Hiroaki Tomita, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 238 days.

(21) Appl. No.: 11/527,617

(22) Filed: Sep. 27, 2006

(65) Prior Publication Data

US 2007/0074928 A1    Apr. 5, 2007

(30) Foreign Application Priority Data

Sep. 30, 2005    (JP) .............................. 2005-288031

(51) Int. Cl.
*B62D 5/04* (2006.01)

(52) U.S. Cl. ....................................... 180/443; 280/272

(58) Field of Classification Search ................ 180/443, 180/444; 280/272
See application file for complete search history.

(56) References Cited

U.S. PATENT DOCUMENTS

| 5,511,823 | A | | 4/1996 | Yamaguchi et al. | |
| 5,855,250 | A | * | 1/1999 | Nishi .......................... | 180/312 |
| 6,966,399 | B2 | * | 11/2005 | Tanigaki et al. ............. | 180/444 |
| 2004/0099470 | A1 | * | 5/2004 | Tanigaki et al. ............. | 180/443 |
| 2005/0039961 | A1 | | 2/2005 | Moriyama | |
| 2006/0175124 | A1 | * | 8/2006 | Saito et al. ................... | 180/444 |
| 2006/0196722 | A1 | * | 9/2006 | Makabe et al. ............... | 180/443 |
| 2007/0074928 | A1 | * | 4/2007 | Okada et al. ................. | 180/444 |
| 2008/0006471 | A1 | * | 1/2008 | Nakamura et al. ........... | 180/444 |
| 2008/0023251 | A1 | * | 1/2008 | Inaguma et al. ............. | 180/400 |
| 2008/0053743 | A1 | * | 3/2008 | Tomita ........................ | 180/443 |

FOREIGN PATENT DOCUMENTS

| EP | 0894694 A2 | 2/1999 |
| EP | 1571063 A2 | 9/2005 |
| GB | 2357741 A | 7/2001 |
| JP | 3-1877 U | 1/1991 |
| JP | 11-157476 A | 6/1999 |
| JP | 2000-211533 A | 8/2000 |
| JP | 2004-231011 A | 8/2004 |

* cited by examiner

*Primary Examiner*—Lesley Morris
*Assistant Examiner*—Tashiana Adams
(74) *Attorney, Agent, or Firm*—Birch, Stewart, Kolasch & Birch, LLP

(57) ABSTRACT

To make an electrically-operated power steering unit less susceptible to influence of change in a positional relationship between supporting sections respectively at the two ends of the electrically-operated power steering unit. A gear case included in a electrically-operated power steering unit is attached to the lower section of a vehicle body frame, and the lower end portion of a steering shaft is rotatably supported by a housing annexed to the gear case with an upper bearing interposed in between, in a vehicle in which an input shaft provided to the electrically-operated power steering unit is linked to the lower end portion of the steering shaft, and in which an output shaft provided to the electrically-operated power steering unit is rotatably supported by the lower section of a vehicle body.

10 Claims, 8 Drawing Sheets

STEERING SHAFT SUPPORTING STRUCTURE OF VEHICLE

CROSS-REFERENCE TO RELATED APPLICATIONS

The present application claims priority under 35 USC 119 to Japanese Patent Application No. 2005-288031 filed on Sep. 30, 2005 the entire contents of which are hereby incorporated by reference.

BACKGROUND OF THE INVENTION

1. Field of the Invention

The present invention relates to modification of a steering shaft supporting structure of a vehicle.

2. Description of Background Art

A structure for supporting an input shaft and an output shaft of a power steering system respectively with different constituent members of a vehicle body frame has been heretofore known as a conventional type of a steering shaft supporting structure of a vehicle. See, Japanese Patent Laid-open Official Gazette No. 2004-23101.

The following configuration is described in FIG. 4 of Japanese Patent Laid-open Official Gazette No. 2004-23101. In this configuration, an upper shaft 50a of a steering shaft 50 is rotatably attached to an upper pipe 18 constituting a vehicle body frame by use of a shaft supporting member 52, an end of a lower shaft 50b provided to an electrically-operated power steering system is linked to the upper shaft 50a by use of a universal joint 51, and the other end of the lower shaft 50b is rotatably attached to a lower bracket 54 provided to a front cross pipe 23 by use of a gear case 55.

The upper shaft 50a and the lower shaft 50b constituting the steering shaft 50 are supported respectively by different members which are the upper pipe 18 and the front cross pipe 23. As a result, the distance between, and a positional relation between, the shaft supporting member 52 near the upper shaft 50a and the lower bracket 54 near the lower shaft 50b vary, for example, due to inaccuracy in manufacturing the vehicle body frame, and due to change in shape of the vehicle body frame which is caused when an external force works on the vehicle body frame. If this variation becomes larger, the universal joint 51 is not capable of accommodating this variation. Accordingly, the supporting of the electrically-operated power steering system becomes susceptible to the variation.

SUMMARY AND OBJECTS OF THE INVENTION

An object of an embodiment of the present invention to make an electrically-operated power steering unit less susceptible to influence of a change in a positional relationship between supporting sections respectively at the two ends of the electrically-operated power steering unit.

According to an embodiment of the present invention, a gear case of an electrically-operated power steering unit is attached to the lower section of a vehicle body frame with the lower end portion of a steering shaft being rotatably supported by a housing annexed to the gear case with a bearing interposed in between. A steering shaft is rotatably supported by the upper section of the vehicle body frame with a handlebar being attached to the upper end of this steering shaft. An input shaft is provided to the electrically-operated power steering unit that is linked to the lower end portion of the steering shaft. An output shaft is provided to the electrically-operated power steering unit that is rotatably supported by the lower section of the vehicle body frame.

As the working effect of supporting the electrically-operated power steering unit, the input shaft of the electrically-operated power steering unit is supported by the lower section of the vehicle body frame by use of the housing and the gear case, and the output shaft of the electrically-operated power steering unit is also supported by the lower section of the vehicle body frame.

Both the input shaft and the output shaft of the electrically-operated power steering unit are supported by the lower section of the same vehicle body frame in this manner. For this reason, the electrically-operated power steering unit is less susceptible to an influence relating to an inaccuracy in manufacturing the vehicle body frame, a change in shape of the vehicle body frame, and the like.

According to an embodiment of the present invention, a lower section of the steering shaft is provided with a handlebar stopper for limiting an angle at which this steering shaft rotates to a predetermined angle. In addition, a part of the steering shaft in a vicinity of this handlebar stopper is attached to the housing with the bearing interposed in between.

As a working effect of the handlebar stopper, the handlebar stopper limits the angle at which the steering shaft rotates to the predetermined angle. For example, this prevents a torsion bar from detecting a steering torque from being twisted beyond the predetermined angle, the torsion bar being included in the electrically-operated power steering unit.

In addition, the part of the steering shaft in the vicinity of the handlebar stopper is attached to the housing with the bearing interposed in between. This attachment makes it possible to receive a torque, which is caused when the handlebar stopper is operated, by use of a rigid bearing supporting unit.

According to an embodiment of the present invention, the lower end portion of the steering shaft and the input shaft are linked to each other, and concurrently that the steering shaft and the input shaft are configured to be capable of being displaced relative to each other in an axial directions thereof.

As a working effect of linking the steering shaft and the input shaft with each other, when an external force works on the steering shaft due to an inaccuracy in manufacturing the vehicle body frame, an inaccuracy in assemblage of the vehicle body frame, and a change in a shape of the vehicle body frame, the steering shaft and the input shaft are displaced relative to each other in the axial directions. Thereby, a thrust force is less likely to work on the input shaft.

According to an embodiment of the present invention, the bearing is configured to be of a double-row type.

As a working effect of the bearing, the withstand load of the bearing increases because of the use of the bearing of the double-row type.

According to an embodiment of the present invention, the steering shaft is divided into separate units which are an upper shaft near the handlebar and an lower shaft including the handlebar stopper. One linkage portion, where the upper shaft and the lower shaft are linked to each other, is formed in the shape of a shaft. The other linkage portion where the upper shaft and the lower shaft are linked to each other is formed in the shape of a hole. Concurrently an expanding slot is provided to an interstice between an outer circumferential surface of this linkage portion and an inner circumferential surface of the hole with one of the linkage portions being fitted into the other of the linkage portions above the bearing, and the linkage portions are fastened to each other.

As a working effect of the linkage structure concerning the steering shaft, one of the linkage portions where the upper shaft and the lower shaft are linked to each other and the other of the linkage portions are fitted into each other, the former linkage portion being formed in the shape of the shaft, and the latter linkage portion being formed in the shape of the hole. Thus, one of the linkage portions is fastened to the other of the linkage portions. This makes it possible to link the upper shaft and the lower shaft to each other easily and securely.

According to an embodiment of the present invention, a portion for positioning the bearing and a portion for positioning the upper shaft are formed in the lower shaft.

As a working effect of the lower shaft, the formation of the portion for positioning the bearing and the portion for positioning the upper shaft in the lower shaft, for example, makes it possible to position the bearing in the housing, to position the lower shaft in the bearing, and to position the upper shaft in the lower shaft.

According to an embodiment of the present invention, a second handlebar stopper is provided to a lower section of the electrically-operated power steering unit, and that the handlebar stopper is configured to start to operate before the second handlebar stopper operates, when rightward and leftward steering is performed with the handlebar.

As a working effect of the handlebar stopper and the second handlebar stopper, in a case where the input shaft and the output shaft are linked to each other, for example, by use of a torsion bar for detecting the steering torque, no load works on the torsion bar. This is because, when the handlebar is steered rightward and leftward, the handlebar stopper operates first, and thus the rotation is not transmitted from the input shaft to the output shaft.

In the case of the structure in which, for example, the second handlebar stopper operates prior to the handlebar stopper, the input shaft up to the output shaft are twisted until the handlebar stopper starts to operate, even after the second handlebar stopper operates. As a result, there are some cases where a large load works on the torsion bar.

According to an embodiment of the present invention, an opening is provided to a rear wall of the housing, and a conductor to be connected to the electrically-operated power steering unit is configured to pass through the opening.

As a working effect of the opening in the housing, the provision of the opening to the rear surface of the housing makes flying gravel, rain water, dust and the like less likely to enter the housing from the front of the vehicle. In addition, the causing of the conductor to pass through the opening makes it easy to manage the conductor, the conductor being connected to the electrically-operated power steering unit.

According to an embodiment of the present invention, the gear case included in the electrically-operated power steering unit is attached to the lower section of the vehicle body frame, and the lower end portion of the steering shaft is rotatably supported by the housing annexed to the gear case with the bearing interposed in between. By this, both of the input shaft and the output shaft of the electrically-operated power steering unit are supported by the lower section of the vehicle body frame. Consequently, in a case where the electrically-operated power steering unit is supported by the vehicle body frame, this support makes the electrically-operated power steering unit less likely to be susceptible to the influence of an inaccuracy in manufacturing the vehicle body frame, a change in shape thereof and the like.

According to an embodiment of the present invention, the lower section of the steering shaft is provided with the handlebar stopper for limiting the angle at which this steering shaft rotates to the predetermined angle, and the part of the steering shaft in the vicinity of this handlebar stopper is attached to the housing with the bearing interposed in between. By the handlebar stopper, it is made possible, for example, to prevent the torsion bar for detecting the steering torque from being twisted beyond the predetermined angle, the torsion bar being included in the electrically-operated power steering unit.

In addition, the attaching of the part of the steering shaft in the vicinity of the handlebar stopper to the housing with the bearing interposed in between makes it possible to receive a torque, which is generated when the handlebar stopper operates, by a rigid bearing supporting unit.

According to an embodiment of the present invention, the lower end portion of the steering shaft and the input shaft are linked to each other, and concurrently the steering shaft and the input shaft are configured to be capable of being displaced relative to each other in the axial directions. This makes it possible to make a thrust force less likely to work on the input shaft, and to accordingly protect the electrically-operated power steering unit, when an external force works on the steering shaft because of an inaccuracy in manufacturing, and assemblage into, the vehicle body frame as well as change in the shape thereof.

According to an embodiment of the present invention, the bearing is configured to be of the double-row type. This makes it possible to enlarge bearing load (withstand load of the bearing) which the bearing is capable of supporting, and to further inhibit the lower end portion of the steering shaft from tilting. As a result, tilting load put on the steering shaft is less likely to work on the input shaft.

According to an embodiment of the present invention, the steering shaft is divided into the separate units which are the upper shaft near the handlebar and the lower shaft including the handlebar stopper with one linkage portion where the upper shaft and the lower shaft are linked to each other being formed in the shape of a shaft. The other linkage portion where the upper shaft and the lower shaft are linked to each other is formed in the shape of a hole, and concurrently the expanding slot is provided in the interstice between the outer circumferential surface of this linkage portion and the inner circumferential surface of the hole. One of the linkage portions is fitted into the other of the linkage portions above the bearing, and the linkage portions are fastened to each other. This makes it possible to link the upper shaft and the lower shaft to each other easily and securely.

According to an embodiment of the present invention, the portion for positioning the bearing and the portion for positioning the upper shaft are formed in the lower shaft. Thereby, for example, the bearing is positioned in the housing, the lower shaft is positioned in the bearing, and the upper shaft is positioned in the lower shaft. In this manner, the assemblage can be carried out efficiently.

According to an embodiment of the present invention, the second handlebar stopper is provided to the lower section of the electrically-operated power steering unit, and the handlebar stopper is configured to start to operate before the second handlebar stopper operates, when the leftward and rightward steering is performed with the handlebar. As a result, in the case where the electrically-operated power steering unit is provided with the torsion bar for detecting the steering torque, this makes it possible to prevent a large load from working on the torsion bar while the handlebar is being operated.

According to an embodiment of the present invention, the opening is provided to a rear surface of the housing, and the conductor to be connected to the electrically-operated power steering unit is configured to pass through the opening. This makes it possible to make flying gravel, rain water, dust and the like less likely to enter the housing from the front of the vehicle. In addition, the causing of the conductor to pass through the opening makes it possible to manage the conductor easily, the conductor being connected to the electrically-operated power steering unit.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
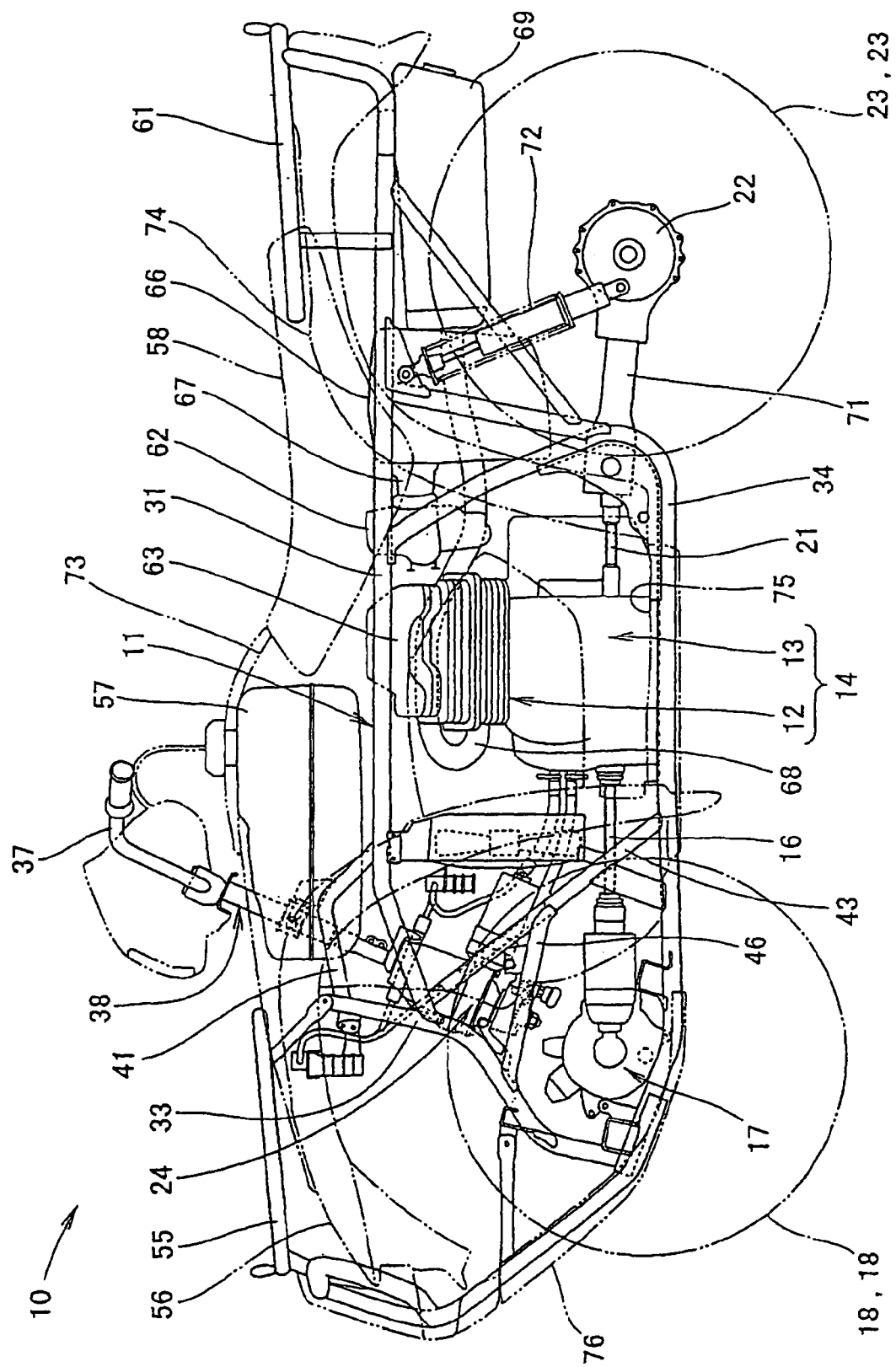
FIG. 1 is a side view of a vehicle for which a steering shaft supporting structure according to the present invention is adopted.

Descriptions will be provided for the best mode for carrying out the invention on the basis of the appended drawings. Incidentally, the drawings should be looked at in a direction in which the reference numerals read.

FIG. 1 is a side view of a vehicle for which a steering shaft supporting structure according to the present invention is adopted. A rough-terrain vehicle 10 as a vehicle is a four-wheel-drive vehicle with a power unit 14 including an engine 12 and a transmission 13 being mounted in the middle section of a vehicle body frame 11. A front-end deceleration system 17 is linked to the front section of the transmission 13 by use of a front propeller shaft 16. Right and left front wheels 18 and 18 are linked to this front-end deceleration system 17 by use of a drive shaft, which is not illustrated. A rear-end deceleration system 22 is linked to the rear section of the transmission 13 by use of a rear propeller shaft 21. Right and left rear wheels 23 and 23 are linked to this rear-end deceleration system 22 by use of a drive shaft, which is not illustrated. The four-wheel-drive vehicle includes an electrically-operated power steering unit 24 for reducing a steering effort for steering the front wheels 18 and 18.

The vehicle body 11 includes upper main frames 31 and 32 (only reference numeral 31 denoting the upper main frame on this side is shown), a front frame 33, right and left lower main frames 34 and 36 paired with each other (only reference numeral 34 denoting the lower main frame on this side is shown), right and left front upper frame 41 and 42 paired with each other (only reference numeral 41 denoting the front upper frame on this side is shown), right and left oblique frames 43 and 44 paired with each other (only reference numeral 43 denoting the oblique frame on this side is shown), and left and right sub-oblique frames 46 and 47 paired with each other (only reference numeral 46 denoting the sub-oblique frame on this side is shown). The upper main frames 31 and 32 extend forwards and backwards. The front frame 33 is linked to the front ends respectively of these upper main frames 31 and 32, and is shaped like the letter U, which is turned upside down, when viewed from the front of the vehicle. The lower main frames 34 and 36 are linked to the lowermost end of the front frame 33, and concurrently are linked respectively to the middle sections respectively of the upper main frames 31 and 32. The front upper frames 41 and 42 are linked to the uppermost end of the front frame 33, and concurrently are linked respectively to the upper main frames 31 and 32, for the purpose of rotatably supporting the upper section of a steering shaft 38. A handlebar 37 is attached to the uppermost section of the steering shaft 38. The front upper frames 41 and 42 are shaped like a parenthesis <. The oblique frames 43 and 44 are linked respectively to the lower main frames 34 and 36 in a way that the oblique frames 43 and 44 extend backwards respectively from the front ends of the upper main frames 31 and 32 downwards to the lower main frames 34 and 36. The sub-oblique frames 46 and 47 are linked respectively to the middle sections of these oblique frames 43 and 44, and concurrently are linked to the front frame 33, in a way that the sub-oblique frame 46 spans between the middle section of the oblique frame 43 and the front frame 33, and in a way that the sub-oblique frame 47 spans between the middle section of the oblique frame 44 and the front frame 33. In this way, the sub-oblique frame 46 and 47 support the lower section of the electrically-operated power steering unit 24.

In this respect, a front carrier 55 is provided together with a front fender 56, a fuel tank 57, a seat 58, a rear carrier 61, carburetor 62, an air cleaner 66, an exhaust pipe 68, a muffler 69, a swing arm 71, left and right rear shock absorber units 72 and 72 paired with each other (only reference numeral 72 denoting the rear shock absorber unit on this side is shown), a body side cover 73, a rear fender 74, a step floor 75 and a skid plate 76. The front fender 56 covers the top and the rear of the front wheel 18. The carburetor 62 is linked to the rear section of a cylinder head 63 of the engine 12. The air cleaner 66 is linked to the carburetor 62 by use of a connecting tube 67. The exhaust pipe 68 extends from the front section of the cylinder head 63 towards the rear section of the vehicle. The muffler 69 is connected to the rear end of the exhaust pipe 68. The swing arm 71 swingably supports the rear wheels 23 and 23 respectively to the lower main frames 34 and 36. The rear shock absorber units 72 and 72 are attached to the swing arm 71, and concurrently are linked respectively to the upper main frames 31 and 32, in a way that the rear shock absorber unit 72 spans between the swing arm 71 and the upper main frame 31, and in a way that the rear shock absorber unit 72 is spanned between the swing arm 71 and the upper main frame 32. The body side cover 73 is disposed at the sides of the power unit 14. The rear fender 74 covers the top and the front of the rear wheel 23. The skid plate 76 covers the front lower sections respectively of the right and left lower main frames 34 and 36, and covers the front of the lower main frames 34 and 36.

Figure 2:
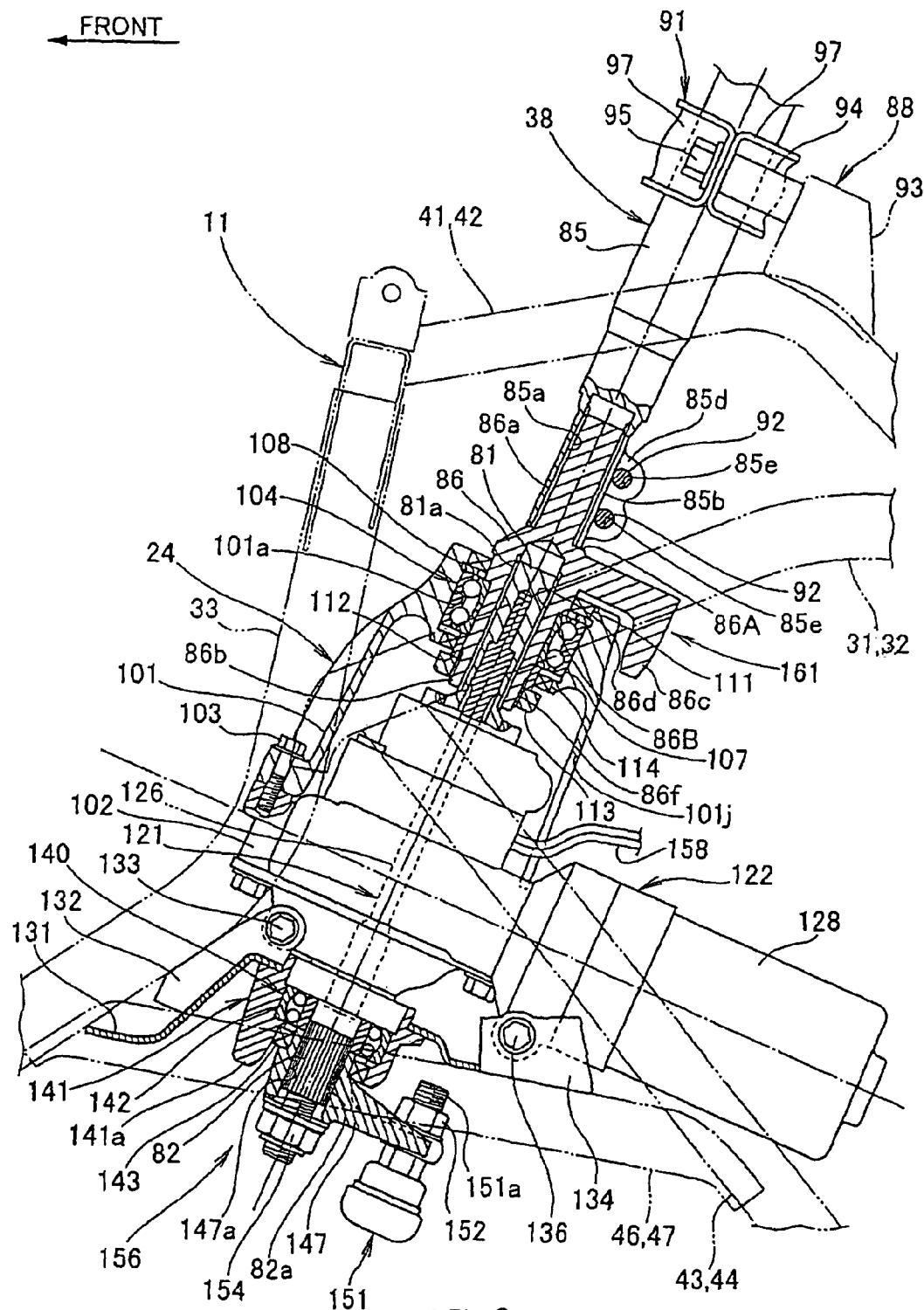
FIG. 2 is a side view of a main part of the vehicle according to the present invention.

FIG. 2 is a side view of a main part of the vehicle according to the present invention, and shows the following configurations. The middle section of the steering shaft 38 is rotatably supported by the upper section of the vehicle body frame 11. An input shaft 81, included in the upper portion of the electrically-operated power steering unit 24, is linked to the lowermost section of the steering shaft 38. The lower section of this electrically-operated power steering unit 24 is attached to a lower section of the vehicle body frame 11, and an output shaft 82, included in the lower section of the electrically-operated power steering shaft 24, is rotatably supported by the lower section of the vehicle body frame 11.

The steering shaft 38 is configured of an upper shaft 85 and a lower shaft 86. The handlebar 37 (see FIG. 1) is attached to the upper end of the upper shaft 85. The upper section of the lower shaft 86 is linked to the lower end of the upper shaft 85 with a serration, and the lower section of the lower shaft 86 is linked to the input shaft 81 with a serration.

The upper shaft 85 is a member which is rotatably attached to a steering supporting bracket 88 with an upper bearing unit 91 interposed in between. The steering supporting bracket 88 is attached to the right and left front upper frames 41 and 42 in a way that the steering supporting bracket 88 spans between the right and left front upper frames 41 and 42. A female serration 85a is formed in the lower end of the upper shaft 85. The female serration 85a is linked to a male serration 86a provided to the upper end of the lower shaft 86. An expanding slot 85b is formed in the upper shaft 85. The expanding slot 85b communicates with the female serration 85a and the outer peripheral surface, and extends in the axial direction of the upper shaft 85. Projecting portions 85c and 85d are integrally formed respectively with the two edges of this expanding slot 85b (only reference numeral 85d denoting the protruding portion on the back side is shown). Bolt inserting holes 85e are made respectively in the projecting portions 85c and 85d. A bolt 92 is inserted in each of the bolt inserting holes 85e, and a nut (not illustrated) is screwed to the extremity of the bolt 92. Thereby, the upper end of the lower shaft 86 is fastened with the lower end of the upper shaft 85. In addition, a positioning portion 86A is provided to the lower shaft 86 for the purpose of positioning the upper shaft 85 by touching a tip of the upper shaft 85 to the positioning portion.

The steering supporting bracket 88 is configured of a crossed member 93 as well as right and left boss portions 94 and 94 (only reference numeral 94 denoting the boss portion on this side is shown). The crossed member 93 is spanned between the front upper frames 41 and 42. The right and left boss portions 94 and 94 are attached to this crossed member 93. A bolt 95 is screwed into each of the boss portions 94 and 94. Thereby, the upper bearing unit 91 is fixed thereto.

The upper bearing unit 91 is configured of a bushing (not illustrated) and a pair of holding fittings 97 and 97. The bushing is slidably fitted to the upper shaft 85. The pair of holding fittings 97 and 97 holds this bushing.

The lower shaft 86 includes an axle portion 86b in the lower section thereof, and an L-shaped projecting portion 86c in the middle section thereof. The L-shaped projecting portion 86c projects backwards in the shape of the letter L. The lower shaft 86 is a member formed to have a female serration 86d which is linked to a male serration 81a formed in the extremity of the input shaft 81.

A housing 101 covering over the electrically-operated power steering unit 24 is annexed with the electrically-operated power steering unit 24. The housing 101 is a member as follows. The lower section of the housing 101 is attached to a gear case 102 of the electrically-operated power steering unit 24 with a plurality of bolts 103. The upper section of the housing 101 rotatably supports the axle portion 86b of the lower shaft 86 with a middle-section bearing unit 104 interposed in between.

The middle-section bearing unit 104 is configured of an upper bearing 107, a locating snap ring 108, a sealing member 111, a collar 112, a nut 113 and a sealing member 114. The upper bearing 107 is of a double-row type, and is fitted to a hole section 101a and the axle portion 86b, and the hole section 101a is perforated in the upper section of the housing 101. The locating snap ring 108 is positioned at an end of this upper bearing 107. The sealing member 111 is caused to be adjacent to this locating snap ring 108, and thus is fitted to an end portion of the hole section 101a. The collar 112 is fitted to the axle portion 86b, and is touched with the other end of the upper bearing 107. The nut 113 is screwed to a male screw 86f in the extremity of the axle portion 86b, and thereby the upper bearing 107 is fixed with the nut 113 while the other end of the upper bearing 107 is being pressed against the nut 113 with the collar 112 interposed in between. The sealing member 114 is fitted to the interstice between the hole section 101a and the collar 112. In addition, a positioning portion 86B is formed in the axle portion 86b for the purpose of positioning the upper bearing 107 by touching the end of the upper bearing 107 with the positioning portion.

As described above, the lower shaft 86 of the steering shaft 38 including the lower end portion of the lower shaft 86 is supported by the housing 101 with the upper bearing 107 interposed in between. Along with the electrically-operated steering unit 24, the lower shaft 86 is attached to the vehicle body frame 11. In addition, the lower shaft 86 is linked to the upper shaft 85 of the steering shaft 38.

The electrically-operated steering unit 24 includes the input shaft 81 and the output shaft 82, a torque sensor unit 121 and a power assist unit 122. The torque sensor unit 121 detects a steering torque. The power assist unit 122 generates power for assisting the power steering. The electrically-operated power steering unit 24 controls the power assist unit 122 with a control unit, which is not illustrated, on the basis of the steering torque detected by the torque sensor unit 121 and the like.

The torque sensor unit 121 includes a torsion bar 126 linked to the input shaft 81 and the output shaft 82.

When the input shaft 81 is rotated through operating the handlebar 37 (see FIG. 1), a relative rotational angle occurs between the input shaft 81 and the output shaft 82, and thus the torsion bar 126 is twisted. The steering torque is obtained by converting this amount of twist to a torque.

The power assist unit 122 is a section configured of an electric motor 128, a clutch (not illustrated) and a deceleration system (not illustrated). The clutch is interposed between an output axle of this electric motor 128 and the output shaft 82. (The deceleration system is configured of a worm gear and a worm wheel.)

The power steering unit 24 has the following configuration. A part of the gear case 102 frontward of the output shaft 82 is attached to a lower bracket 131 with a bolt 133 by use of a frontal supporting member 132. The lower bracket 131 is shaped like a plate, and is attached to the sub-oblique frames 46 and 47 in a way that the lower bracket 131 spans between the sub-oblique frames 46 and 47. In addition, a part of the gear case 102 backward of the output shaft 82 is attached to a rear supporting member 134 with bolt 136. The rear supporting member 134 is provided to the sub-oblique frames 46 and 47.

As described above, the electrically-operated power steering unit 24 is a member where the lower section of the gear case 102 is held at two locations, which are the frontal supporting member 132 at the front side and the rear supporting member 134 at the rear side, in a way that the output shaft 82 is interposed between the frontal supporting member 132 and the rear supporting member 134.

The control unit controls the power assist unit 122 on the basis of the steering torque, a steering angle, a vehicle speed of the rough terrain vehicle 10 (see FIG. 1), and the like. The steering torque is detected by the torque sensor unit 121. The steering angle is detected by a steering angle sensor (not illustrated).

A lower bearing unit 140 rotatably supports the output shaft 82. The lower bearing unit 140 includes an axle supporting member 141, a lower bearing 142 and a sealing member 143. The axle supporting member 141 is attached to the center section of the lower bracket 131. The lower bearing 142 is a self-aligning type, and is attached to the axle supporting member 141 for the purpose of rotatably supporting the output shaft 82. The sealing member 143 protects this lower bearing 142 from dust and the like.

The axle supporting member 141 includes a downward projecting portion 141a that is formed at the front side of the vehicle. The downward projecting portion 141a projects downwards nearly along the output shaft 82.

A center arm 147 is provided together with a female spline 147a that is formed in the center arm 147. Thereby, this female spline 147a is linked to a male spline 82a formed in the low end portion of the output shaft 82.

A ball joint 151 includes a bolt portion 151a provided to the end portion of the ball joint 151 that is attached to the rear portion of the center arm 147 with a nut 152.

A nut 154 is provided for fixing the center arm 147 to the output shaft 82 by linking the nut 154 to a male screw provided to the extremity of the output shaft 82.

The foregoing downward projecting portion 141a of the axle supporting member 141 and the center arm 147 constitute a lower handlebar stopper 156.

Figure 3:
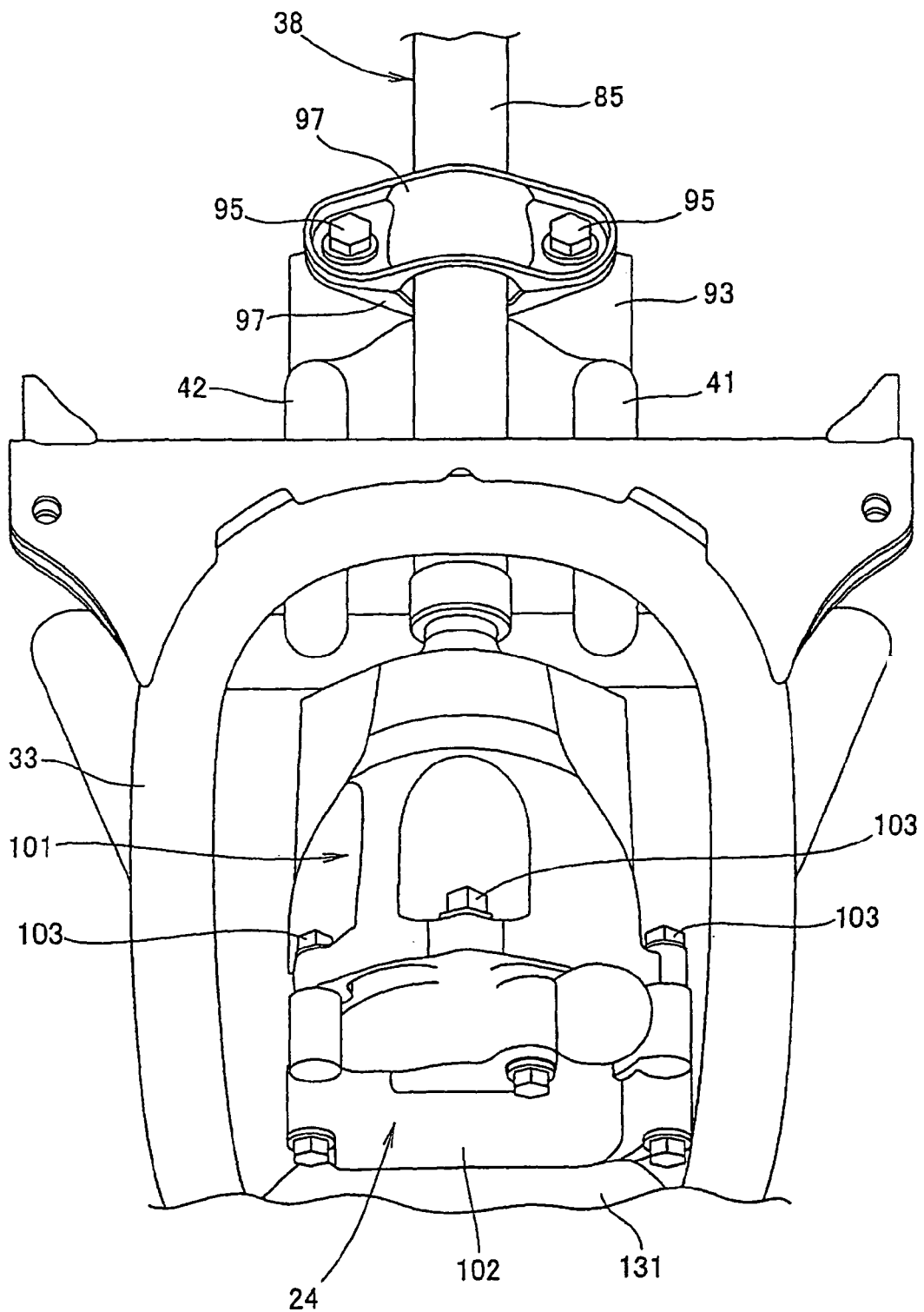
FIG. 3 is a front view of a main part of the vehicle according to the present invention.

FIG. 3 is a front view of a main part of the vehicle according to the present invention. FIG. 3 shows that the housing 101 is attached to the electrically-operated power steering unit 24 with the plurality of bolts 103, and that the housing 101 covers the top of the electrically-operated power steering unit 24.

The housing 101 covering the top of the electrically-operated power steering unit 24 in this manner makes it possible to protect the electrically-operated power steering unit 24 from flying gravel, rain water, dust and the like.

Figure 4:
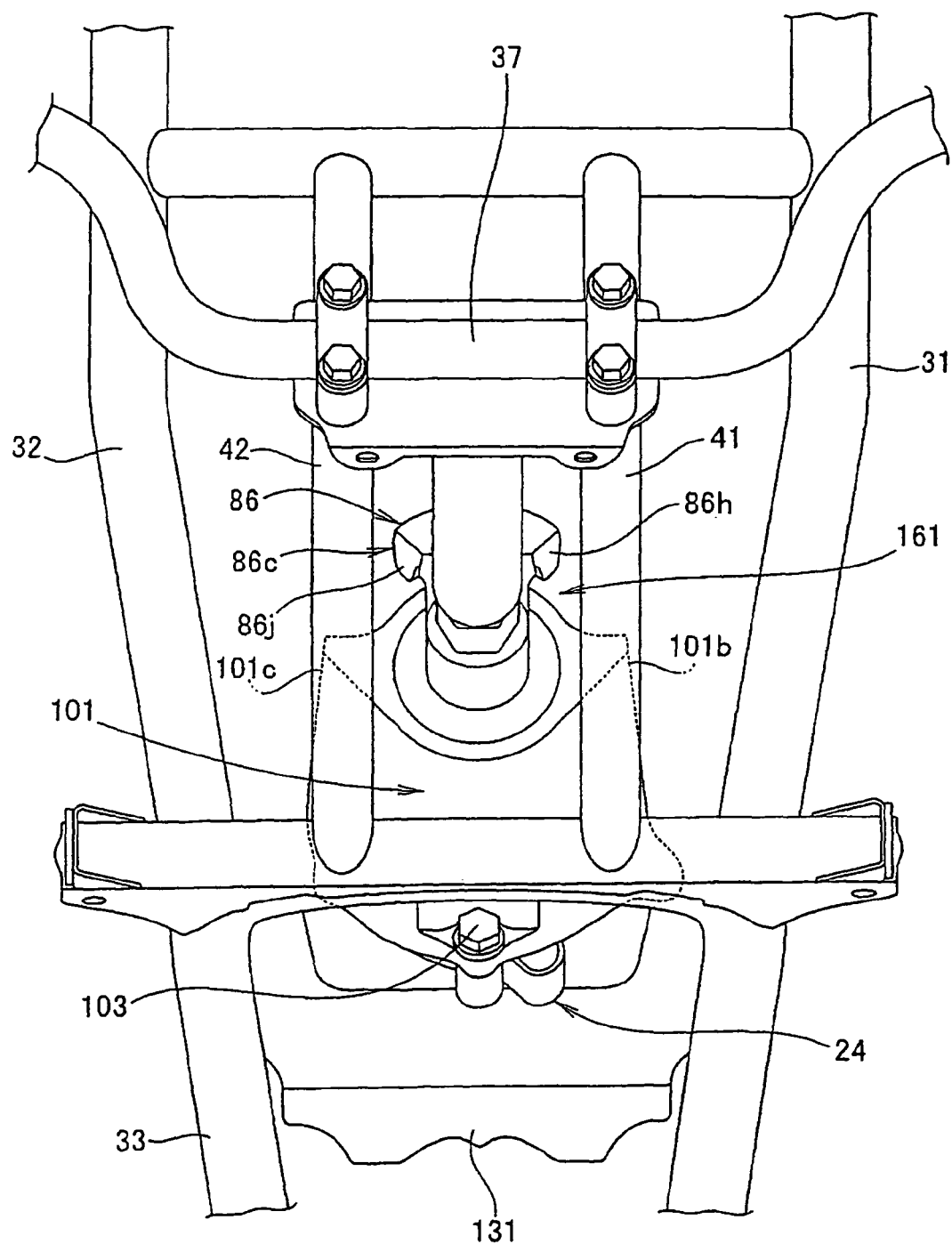
FIG. 4 is a plane view of the main -part of the vehicle according to the present invention.

FIG. 4 is a plane view of the main part of the vehicle according to the present invention. FIG. 4 shows that the upper section of the housing 101 and the L-shaped projecting portion 86c of the lower shaft 86 constitutes an upper handlebar stopper 161 for restricting the range in which the handlebar 37 rotates.

Figure 5:
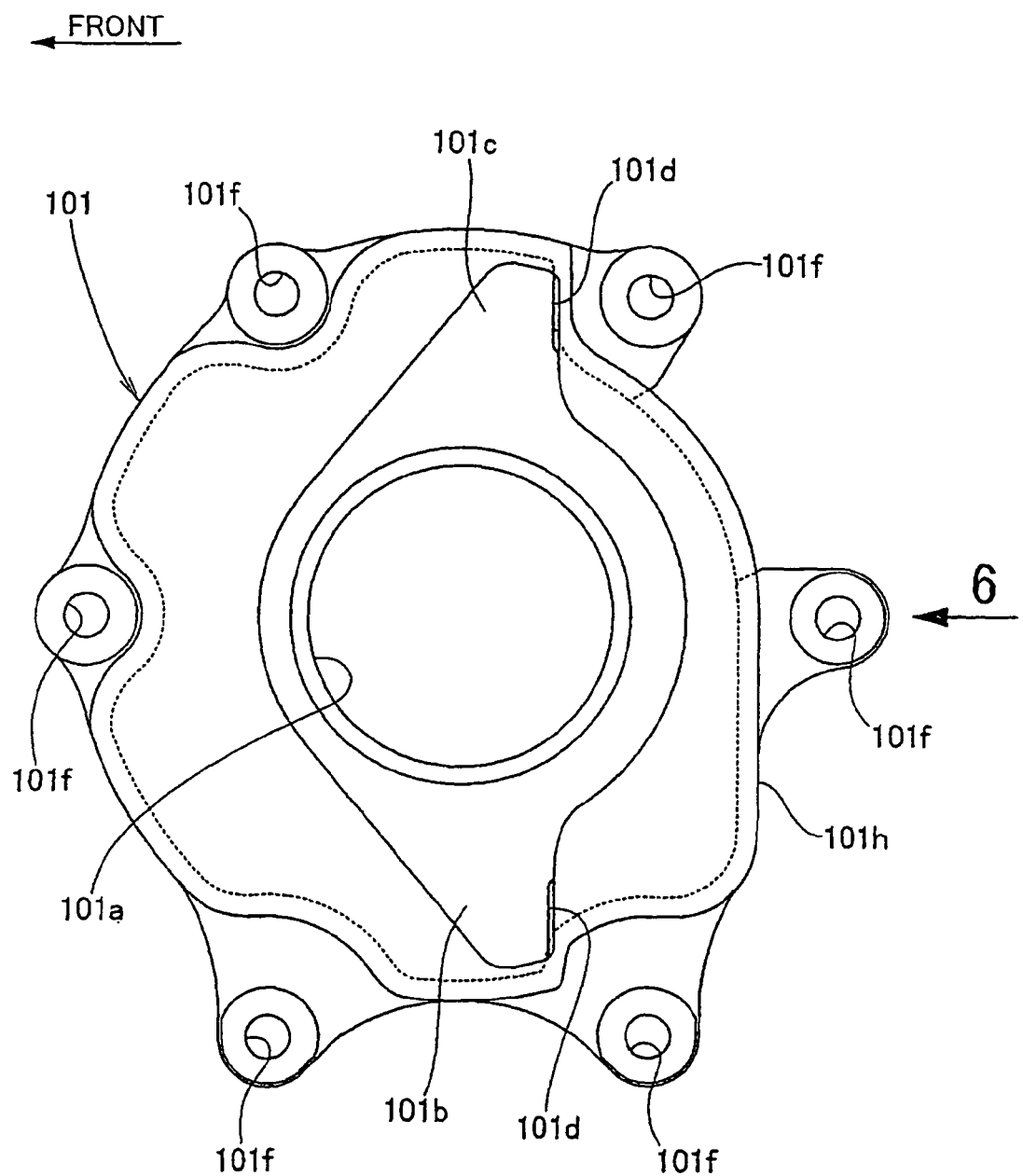
FIG. 5 is a plane view of a housing according to the present invention.

FIG. 5 is a plane view of the housing according to the present invention. With regard to the housing 101, sideward projecting portions 101b and 101c are integrally formed with each other. The sideward projecting portions 101b and 101c projects sideward outside the hole section 101a, which is provided to the upper section of the housing 101, in the vehicle-width direction (in the upward and downward directions of FIG. 5). A reception surface 101d is provided to each of these sideward projecting portions 101b and 101c. The reception surface 101d is capable of abutting on the L-shaped projecting portion 86c (see FIG. 4) of the lower shaft 86 (see FIG. 4). In addition, a bolt inserting hole 101f is provided in the housing 101 for the purpose of causing the bolt 103 (see FIG. 3) to be inserted into the bolt inserting hole 101f.

The reception surface 101d is a part obtained by cutting the surface of the raw material in order to accurately restrict the angle at which the handlebar 37 (see FIG. 1) rotates.

Figure 6:
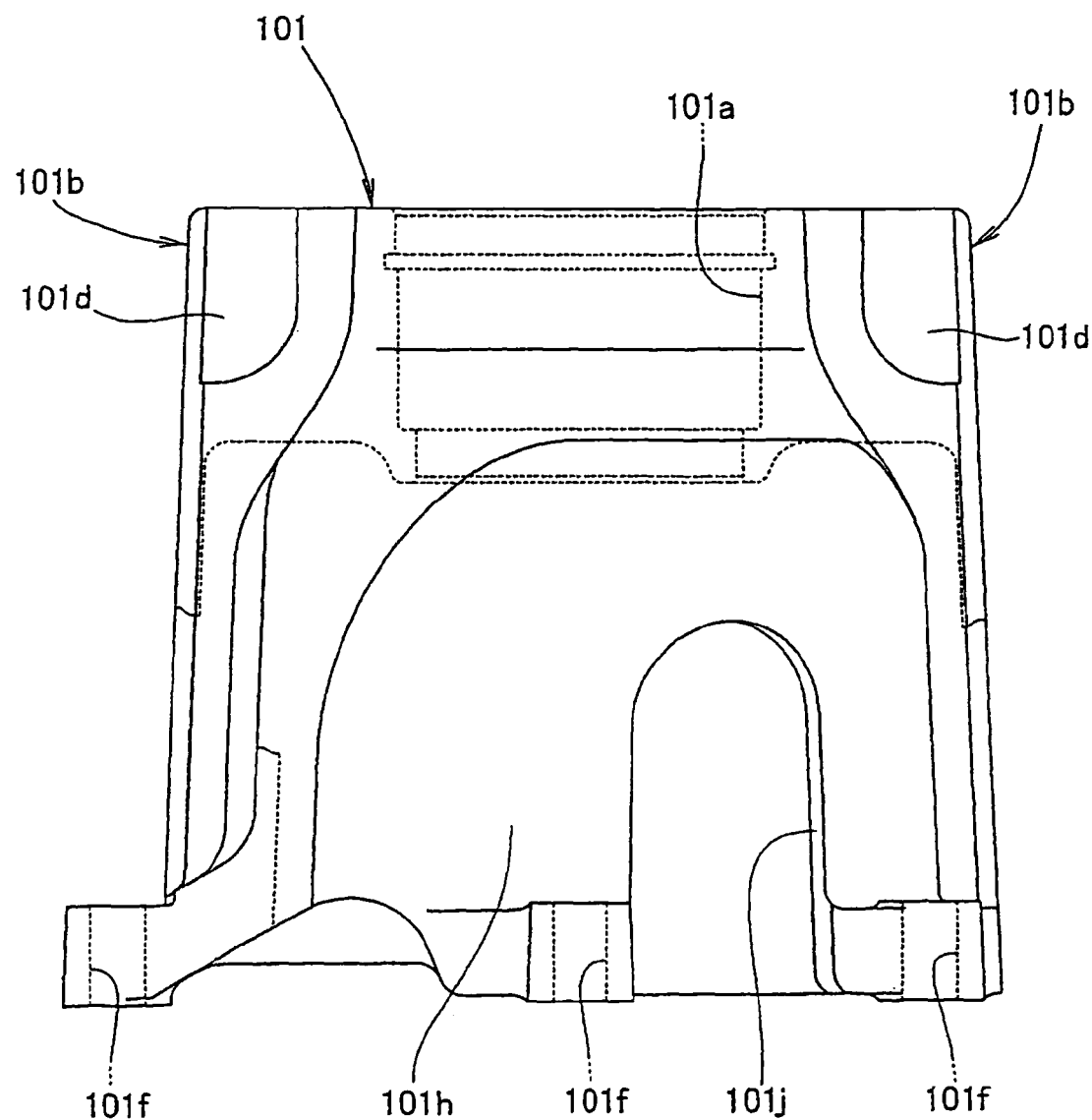
FIG. 6 is a diagram showing the housing 101 of FIG. 5 in a direction indicated by an arrow 6.

FIG. 6 is a diagram showing the housing 101 of FIG. 5 in a direction indicated by an arrow 6. FIG. 6 shows that an opening 101j is made in a part at the right of the center of a rear wall 101h of the housing 101, and that the reception surfaces 101d and 101d which are plane are formed on the left side and the right side of the upper section of the housing 101.

A conductor 158 (see FIG. 2), for the power supply connected to the electrically-operated power steering unit 24 (see FIG. 2), and for the control of the electrically-operated power steering unit 24, passes through the opening 101j.

Descriptions will be provided next for an operation of the foregoing upper handlebar stopper 161.

Figure 7:
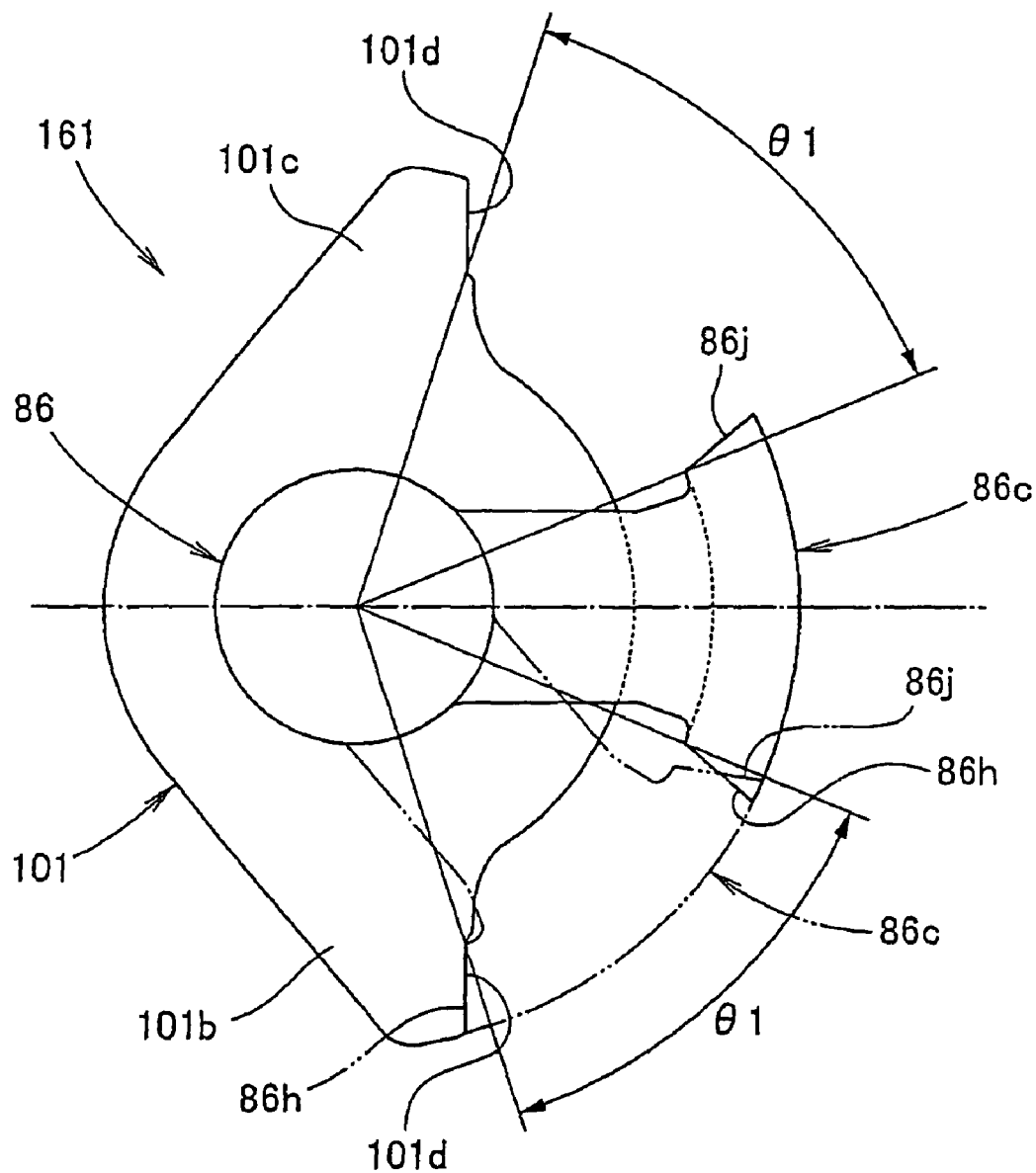
FIG. 7 is an operational diagram showing an operation of an upper handlebar stopper according to the present invention.

FIG. 7 is an operational diagram showing the operation of the upper handlebar stopper according to the present invention.

When the lower shaft 86 rotates in response to the rotation of the upper shaft 85 (see FIG. 2), end surfaces 86h and 86j of the L-shaped projecting portion 86c provided to the lower shaft 86 respectively hit the reception surface 101d and 101d of the housing 101. Thereby, the range in which the lower shaft 86 rotates is restricted. A position of the L-shaped projecting portion 86c which is shown by a solid line in the figure is that which is observed when the handlebar 37 (see FIG. 1) is located at a position for causing the vehicle to operate in a forward direction. A position of the L-shaped projecting portion 86c which is shown by an imaginary line in the figure is that which is observed when the range in which the lower shaft 86 rotates is restricted.

θ1 denotes a range in which the lower shaft 86 rotates clockwise and counter-clockwise from the position wherein the handlebar is located for causing the vehicle to operate in a forward direction. Concurrently, θ1 denotes ranges in which the handlebar 37 and the upper shaft 85 rotate respectively.

Descriptions will be provided next for an operation of the lower handlebar stopper 156.

Figure 8:
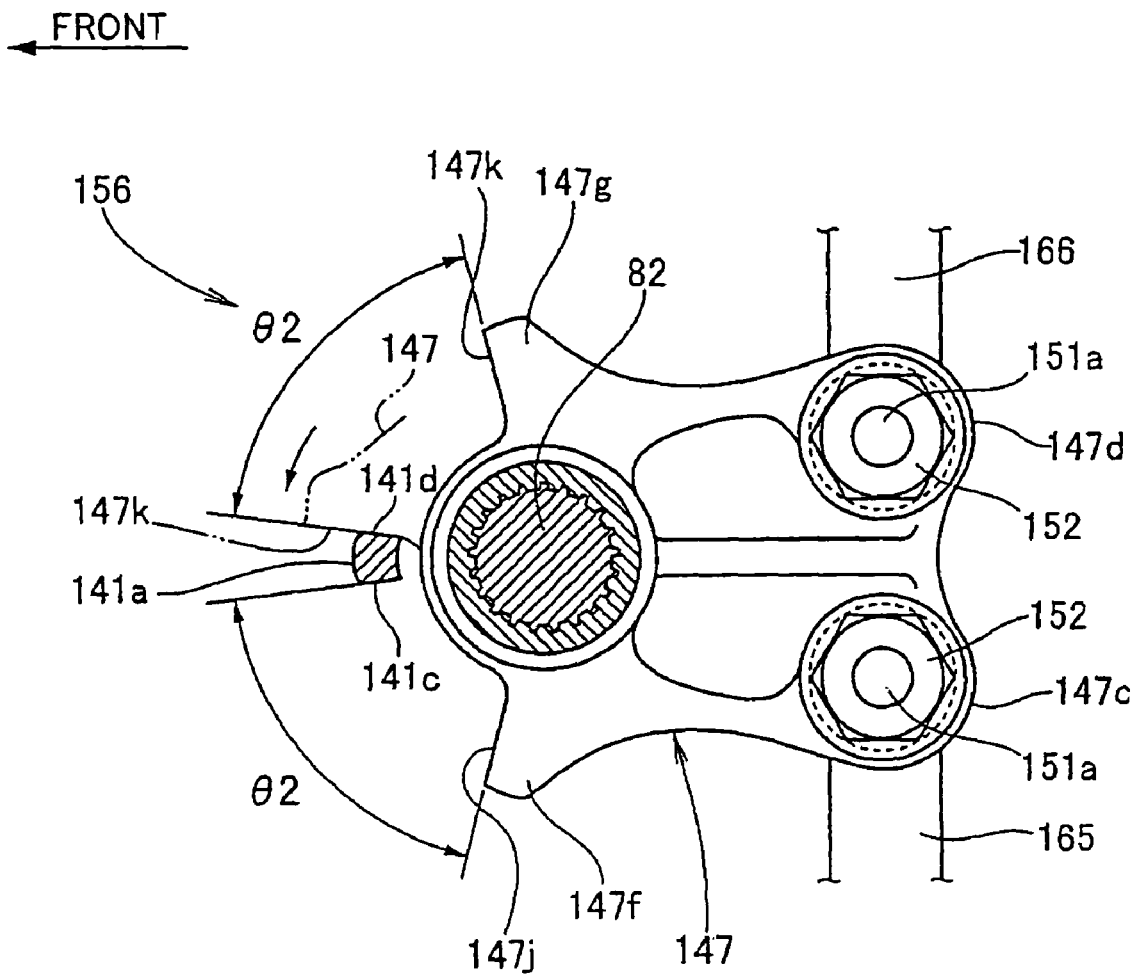
FIG. 8 is an operational diagram showing an operation of an lower handlebar stopper according to the present invention.

FIG. 8 is an operational diagram showing the operation of the lower handlebar stopper according to the present invention.

Tie rods 165 and 166 move in the vehicle-width direction in response to rotation of the output shaft 82, and the right and left front wheels 18 and 18 (see FIG. 1) are accordingly steered. The tie rods 165 and 166 are linked respectively to tie rod linkage parts 147c and 147d provided to the rear section of the center arm 147.

The rotational range is restricted by sideward projecting portions 147f and 147g, more specifically abutting surfaces 147i and 147k, which are provided to the two sides of the center arm 147, hitting the downward projecting portion 141a, more specifically reception surfaces 141c and 141d, of the axle supporting member 141 (see FIG. 2), when the center arm 147 rotates in response to the rotation of the output shaft 82.

A position of the center arm 147 which is shown by a solid line in the figure is that which is observed when the handlebar 37 (see FIG. 1) is located at a position for causing the vehicle to operate in a forward direction. A position of the arm center 147 which is shown by an imaginary line in the figure is that which is observed when the rotation of the handlebar 37 is restricted as a result of turning the handlebar 37 to a large extent.

θ2 denotes a range of an angle at which the center arm 147 swings clockwise and counter-clockwise from the position at which the handlebar is located while the vehicle is operated in a forward direction. Concurrently, θ2 denotes a range of an angle at which the output shaft 82 rotates. θ2 is larger than θ1 which has been shown in FIG. 7, and which denotes the range of an angle at which the lower shaft 86 rotates. In other words, the upper handlebar stopper 161 starts to operate before the lower handlebar stopper 156 operates. To put another way, the range of the angle at which the upper handlebar stopper 161 rotates starts to be restricted before the range of the angle at which the lower handlebar stopper 156 rotates is restricted.

Descriptions will be continued by referring to FIG. 1 again. The rough terrain vehicle 10 includes an overturn sensor, which is not illustrated. In a case where the rough terrain vehicle 10 turns over, the sensor stops the supply of fuel to the engine and the supply of power to the electrically-operated power steering unit 24.

Thereby, the electric motor is not operated even if a torque is detected from the handlebar 37 or the front wheels. Thus, an assist power is not generated. Accordingly, no load is imposed on the torque sensor unit. In addition, power consumption from the battery is held in check.

As shown in FIG. 2, a first aspect of the present invention is the rough terrain vehicle 10 (see FIG. 1) in which the steering shaft 38 is rotatably supported by the upper section of the vehicle body frame 11, the handlebar 37 (see FIG. 1) is attached to the upper end of this steering shaft 38, the input shaft 81 provided to the electrically-operated power steering unit 24 is linked to the lower end portion of the steering shaft 38, and the output shaft 82 provided to the electrically-operated power steering unit 24 is rotatably supported by the lower section of the vehicle body frame 11. The rough terrain vehicle includes the gear case 102 included in the electrically-operated power steering unit 24 that is attached to the lower section of the vehicle body frame 11. The lower end portion of the steering shaft 38 is rotatably supported by the housing 101 annexed to the gear case 102 in the form of a tower with the upper bearing 107 as a bearing interposed in between.

By this, both of the input shaft 81 and the output shaft 82 of the electrically-operated power steering unit 24 are supported by the lower section of the vehicle body frame 11. Consequently, in the case where the electrically-operated power steering unit 24 is supported by the vehicle body frame 11, this support makes the electrically-operated power steering unit 24 less likely to be susceptible to the influence of an inaccuracy in manufacturing the vehicle body frame 11, a change in the shape thereof and the like.

A second aspect of the present invention, as shown in FIG. 2 and 7, includes the lower section of the steering shaft 38 being provided with the upper handlebar stopper 161 for limiting the angle at which this steering shaft 38 rotates to the predetermined angle θ1, and that a part of the steering shaft 38 in a the vicinity of this upper handlebar stopper 161 is attached to the housing 101 with the upper bearing 107 interposed in between.

This makes it possible for the upper handlebar stopper 161, for example, to prevent the torsion bar 126 for detecting the steering torque from being twisted at an angle larger than the predetermined angle, the torsion bar 126 being included in the electrically-operated power steering unit 24.

Moreover, the part of the steering shaft 38 in the vicinity of the upper handlebar stopper 161, more specifically, the lower shaft 86, is attached to the housing 101 with the upper bearing 107 interposed in between. This makes it possible to receive a torque, which is produced when the upper handlebar stopper 161 operates, by use of a rigid bearing supporting part, more specifically, the upper section of the housing 101 which supports the middle-section bearing unit 104.

A third aspect of the present invention, as shown in FIG. 2, includes the lower end portion of the steering shaft 38, more specifically, the lower shaft 86 and the input shaft 81 are linked to each other, and that the steering shaft 38 and the input shaft 81 are configured to be capable of being displaced relative to each other in the axial direction.

This makes it possible to make a thrust force less likely to work on the input shaft 81, and to accordingly protect the electrically-operated power steering unit 24, when an external force works on the steering shaft 38 because of inaccuracy in manufacturing, and assemblage into, the vehicle body frame 11 as well as change in shape of the vehicle body frame 11.

A fourth aspect of the present invention includes the upper bearing 107 being configured to be of a double-row type.

This makes it possible to enlarge the bearing load which the upper bearing 107 is capable of supporting, and to accordingly enhance the reliability.

A fifth aspect of the present invention includes the steering shaft 38 that is divided into separate units which are the upper shaft 85 near the handlebar 37 and the lower shaft 86 including the upper handlebar stopper 161. One linkage portion where the upper shaft 85 and the lower shaft 86 are linked to each other is formed in the shape of a shaft. The other linkage portion where the upper shaft 85 and the lower shaft 86 are linked to each other is formed in the shape of a hole, and concurrently the expanding slot 85b is provided in the interstice between the outer circumferential surface of this linkage portion and the inner circumferential surface of the hole. In addition; one of the linkage portions is fitted into the other of the linkage portions above the upper bearing 107, and the linkage portions are fastened to each other.

This makes it possible to easily and securely link the upper shaft 85 and the lower shaft 86 to each other.

A sixth aspect of the present invention includes forming the positioning portion 86B of the upper bearing 107 and the positioning portion 86A of the upper shaft 85 in the lower shaft 86.

Thereby, for example, the upper bearing 107 is positioned in the housing 101, the lower shaft 86 is positioned in the upper bearing 107, and the upper shaft 85 is positioned in the lower shaft 86. In this manner, the assemblage can be carried out efficiently.

A seventh aspect of the present invention includes the lower handlebar stopper 156 as the second handlebar stopper that is provided to the lower section of the electrically-operated power steering unit 24, and that, when rightward and leftward steering is performed with the handlebar 37 (see FIG. 1), the upper handlebar stopper 161 starts to operate before the lower handlebar stopper 156 operates.

In the case where the electrically-operated power steering unit 24 is provided with the torsion bar 126 for detecting the steering torque, this makes it possible to prevent a large load from working on the torsion bar 126 while the handlebar 37 is being operated.

An eighth aspect of the present invention, as shown in FIGS. 2 and 6, the opening 101j is provided to the rear wall 101h as the rear surface of the housing 101, and that the conductor 158 to be connected to the electrically-operated power steering unit 24 is configured to pass through the opening 101j.

This makes it possible to make flying gravel, rain water, dust and the like less likely to enter the housing 101 from the front of the vehicle. In addition, the configuring of the conductor 158 to pass through the opening 101j makes it possible to manage the conductor 158 easily, the conductor 158 being connected to the electrically-operated power steering unit 24.

In the case of this embodiment, with regard to the steering shaft 38, the upper shaft 85 and the lower shaft 86 are linked to each other with the serration, and the lower shaft 86 and the input shaft 81 are linked to each other with the serration, as shown in FIG. 2. It should be noted, however, that their linkages are not limited to this example, and that the two pairs of shafts may be linked to each other with splines or other types of means (for example, joints).

The steering shaft supporting structure according to the present invention is suitable for vehicles each equipped with the electrically-operated power steering unit.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A steering shaft supporting structure for a vehicle comprising:
    a steering shaft rotatably supported by an upper section of a vehicle body frame;
    an electrically-operated power steering unit having an input shaft linked to a lower end portion of the steering shaft and an output shaft rotatably supported by a lower section of the vehicle body frame;
    a gear case included in the electrically-operated power steering unit, said gear case being attached to the lower section of a vehicle body frame, and having an upper surface;
    a housing surrounding the steering shaft and having a lower surface joined to the upper surface of the gear case;
    a projection on the lower section of the steering shaft; and
    a handlebar stopper on the housing, the projection contacting the handlebar stopper for limiting an angle at which the steering shaft rotates to a predetermined angle,
    wherein the handle bar stopper comprises sideward protruding portions integrally formed on the housing, each sideward protruding portion including a reception surface.

2. The steering shaft supporting structure of the vehicle according to claim 1, wherein a lower end portion of the steering shaft and the input shaft are linked to each other, and concurrently the steering shaft and the input shaft are configured to be capable of being displaced relative to each other in axial directions thereof.

3. The steering shaft supporting structure of the vehicle according to claim 1, wherein the steering shaft is divided into separate units which are an upper shaft near the handlebar and an lower shaft including the handlebar stopper,
    one linkage portion where the upper shaft and the lower shaft are linked to each other is formed in the shape of a shaft,
    the other linkage portion where the upper shaft and the lower shaft are linked with each other is formed in the shape of a hole, and concurrently an expanding slot is provided in an interstice between an outer circumferential surface of the linkage portion and an inner circumferential surface of the hole, and
    one of the linkage portions is fitted into the other of the linkage portions above the bearing, and the linkage portions are fastened to each other.

4. The steering shaft supporting structure of the vehicle according to claim 1, wherein the steering shaft is divided into separate units which are an upper shaft near the handlebar and an lower shaft including the handlebar stopper,
    one linkage portion where the upper shaft and the lower shaft are linked to each other is formed in the shape of a shaft,
    the other linkage portion where the upper shaft and the lower shaft are linked with each other is formed in the shape of a hole, and concurrently an expanding slot is provided in an interstice between an outer circumferential surface of the linkage portion and an inner circumferential surface of the hole, and
    one of the linkage portions is fitted into the other of the linkage portions above the bearing, and the linkage portions are fastened to each other.

5. The steering shaft supporting structure of the vehicle according to claim 1, wherein a second handlebar stopper is provided to a lower section of the electrically-operated power steering unit, and
    the handlebar stopper is configured to start to operate before the second handlebar stopper operates, when rightward and leftward steering is performed with the handlebar.

6. The steering shaft supporting structure of the vehicle according to claim 1, wherein an opening is provided to a rear surface of the housing, and a conductor to be connected to the electrically-operated power steering unit is configured to pass through the opening.

7. The steering shaft supporting structure of the vehicle according to claim 1, further comprising a bearing between the housing and the steering shaft.

8. The steering shaft supporting structure of the vehicle according to claim 7, wherein the bearing is a double row type.

9. A steering shaft for a vehicle, comprising:
    a steering shaft rotatably supported by an upper section of a vehicle body frame;
    a housing surrounding a lower portion of the steering shaft;
    a first projection on the lower section of the steering shaft above the housing;
    a handlebar stopper on the housing, the first projection contacting the handlebar stopper after the steering shaft rotates to a first predetermined angle;
    an axle supporting member, the axle supporting member having a downwardly extending projection;
    a center arm connected to the steering shaft so that the center arm rotates with the steering shaft; and
    a second projection extending outwardly from each side of the center arm,
    wherein the second projections contact the downwardly extending projection to form a second handlebar stopper after the steering shaft rotates a second predetermined angle, the second predetermined angle being greater than the first predetermined angle.

10. The steering shaft for a vehicle according to claim 9, wherein the first projection extends outwardly and downwardly from the steering shaft.

* * * * *